(12) United States Patent
Horikawa

(10) Patent No.: US 6,389,021 B1
(45) Date of Patent: May 14, 2002

(54) INTERCOMMUNICATION APPARATUS AND COMMUNICATION METHOD USING THE INTERCOMMUNICATION APPARATUS

(75) Inventor: Koichi Horikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/376,498

(22) Filed: Aug. 18, 1999

(30) Foreign Application Priority Data

Aug. 18, 1998 (JP) ............................................. 10-231813

(51) Int. Cl.7 ............................................... H04L 12/66
(52) U.S. Cl. .......................... 370/395; 370/401; 370/466
(58) Field of Search .................................. 370/401, 466, 370/392, 389, 395, 396; 709/218

(56) References Cited

U.S. PATENT DOCUMENTS

| 5,715,250 A | * | 2/1998 | Watanabe ..................... 390/395 |
| 5,812,552 A | * | 9/1998 | Arora et al. ................. 370/401 |
| 5,912,891 A | * | 6/1999 | Kanai .......................... 370/395 |
| 6,016,319 A | * | 1/2000 | Kshirsagar et al. .......... 370/440 |
| 6,101,542 A | * | 8/2000 | Miyamoto .................... 709/227 |
| 6,169,739 B1 | | 1/2001 | Isoyama ...................... 370/395 |
| 6,189,041 B1 | * | 2/2001 | Cox et al. .................... 709/238 |

FOREIGN PATENT DOCUMENTS

| JP | 8-274815 | 10/1996 |
| JP | 10-200533 | 7/1998 |
| JP | 10-200545 | 7/1998 |

* cited by examiner

Primary Examiner—Douglas Olms
Assistant Examiner—Ken Vanderpuye
(74) Attorney, Agent, or Firm—Foley & Lardner

(57) ABSTRACT

In an intercommunication apparatus (1), a frame converting portion (30) is provided for interconversion between MAC (Media Access Control) frame encapsulation data and LLC/SNAP (Logical Link Control/SubNetwork Attachment Point) encapsulation data by the use of information related to IPOA (Internet Protocol over Asynchronous Transfer Mode) terminals (200a–200c) and registered in an IPOA server (40).

6 Claims, 7 Drawing Sheets

INTERCOMMUNICATION APPARATUS AND COMMUNICATION METHOD USING THE INTERCOMMUNICATION APPARATUS

BACKGROUND OF THE INVENTION

This invention relates to an intercommunication apparatus and, in particular, to an intercommunication apparatus for carrying out communication between a LAN (Local Area Network) emulation (hereinafter called LANE) terminal and an IP (Internet Protocol) over ATM (Asynchronous Transfer Mode) (hereinafter called IPOA) terminal.

In LANE, provision is made of a mechanism for converting a destination MAC (Media Access Control) address of a particular MAC frame into an appropriate ATM address (resolving the MAC address to obtain the ATM address). MAC frame transfer on a conventional Ethernet is emulated on an ATM network.

On the other hand, in IPOA, provision is made of a mechanism for converting a destination IP address of a packet in a particular network layer into an appropriate ATM address (resolving the IP address to obtain the ATM address) and the packet in the network layer is directly transferred on the ATM network.

As described above, the LANE and the IPOA are different in object and approach of address resolution from each other. Therefore, a LANE terminal and an IPOA terminal can not simultaneously coexist in a same subnetwork.

Therefore, in a particular subnetwork, it is impossible, for example, to operate an ordinary terminal in the LANE while a particular service (for example, a video-on-demand service) is operated by the IPOA terminal.

SUMMARY OF THE INVENTION

It is an object of this invention to provide an intercommunication apparatus which allows a LANE terminal and an IOPA terminal to simultaneously coexist in a same subnetwork.

In order to achieve the above-mentioned object, there is provided an intercommunication apparatus for carrying out communication between one and another of LAN (Local Area Network) emulation terminals and IP (Internet Protocol) over ATM (Asynchronous Transfer Mode) terminals, the apparatus comprising:

an IPOA (IP over ATM) server which stores information related to the IP over ATM terminals;

an encapsulating portion for encapsulating input data;

a frame converting portion for carrying out, by the use of the information stored in the IPOA server, interconversion between MAC (Media Access Control) frame encapsulation data and LLC/SNAP (Logical Link Control/SubNetwork Attachment Point) encapsulation data prepared by the encapsulating portion; and a bridge portion for exchanging data between the LAN emulation terminals and the frame converting portion. The frame converting portion comprises:

a MAC frame input/output portion for input and output of data to and from the bridge portion;

an address table connected to the IPOA server and holding information including an IP address, a MAC address, and an ATM address as entries;

an ARP (Address Resolution Protocol) processing portion connected to the address table for preparing and resolving an ARP request; and a frame processing portion responsive to an IP packet supplied thereto for searching the MAC address in the address table to acquire the ATM address.

There is also provided a communication method for carrying out communication between one and another of the LAN emulation terminals by the use of the above-mentioned intercommunication apparatus, the method comprising:

a step of transmitting the ARP request designating the IP address of a reception terminal of the LAN emulation terminals from a transmission terminal of the LAN emulation terminals to other LAN emulation terminals by a LANE (LAN emulation) protocol;

a step of preparing, in the reception terminal, an ARP reply including the MAC address of the reception terminal, and transmitting the ARP reply to the transmission terminal by communication using the LANE protocol; and a step of preparing, in the transmission terminal, a MAC frame containing the IP packet to be transmitted to the reception terminal by the use of the MAC address contained in the ARP reply transmitted from the reception terminal, and transmitting to the reception terminal the MAC frame thus prepared.

There is also provided a communication method for carrying out communication between one and another of the IP over ATM terminals by the use of the above-mentioned intercommunication apparatus, the method comprising:

a step of transmitting from a transmission terminal of the IP over ATM terminals through the encapsulating portion to the IPOA server an address resolution request for converting the IP address of a reception terminal of the IP over ATM terminals into the ATM address;

a step of encapsulating and transmitting, in response to the address resolution request transmitted from the transmission terminal, an address resolution reply containing the ATM address of the reception terminal from the IPOA server through the encapsulating portion to the transmission terminal; and a step of transmitting the IP packet to the reception terminal by the use of the ATM address of the reception terminal contained in the address resolution reply.

There is furthermore provided a communication method for carrying out communication from a transmission terminal being one of the LAN emulation terminals to a reception terminal being one of the IP over ATM terminals by the use of the above-mentioned intercommunication apparatus, the method comprising:

a step of registering, in said IPOA server, IP address and ATM address information of said reception terminal;

a step of transferring to said address table the IP address and the ATM address information of said reception terminal registered in said IPOA server;

a step of extracting, in said address table, the MAC address of said reception terminal from an ESI (End System Identifier) field of the ATM address of said reception terminal and storing the information of the IP address, the MAC address, and the ATM address of said reception terminal;

a step of transmitting, from said transmission terminal through said bridge portion and said MAC frame input/output portion to said ARP processing portion in accordance with a LANE (LAN emulation) protocol, the ARP request designating the IP address of said reception terminal;

a step of resolving, in said ARP processing portion, said ARP request, detecting the MAC address of said reception terminal from said address table by the use of the IP address of said reception terminal as a target IP address in the ARP request, preparing the ARP reply containing the MAC address, and transmitting it to said transmission terminal through said MAC frame input/output portion and said bridge portion;

a step of preparing, in said transmission terminal, the MAC frame containing the IP packet to be transmitted to said reception terminal in response to the ARP reply, and transmitting it to said frame processing portion through said bridge portion and said frame input/output portion;

a step of detecting, in said frame processing portion, the ATM address of said reception terminal from said address table with reference to the MAC address contained in the MAC frame, and transmitting the ATM address and the IP packet to said encapsulating portion; and a step of encapsulating, in said encapsulating portion, the IP packet and transmitting it to said reception terminal.

There is also provided a communication method for carrying out communication from one of the IP over ATM terminals to one of the LAN emulation terminals by the use of the above-mentioned intercommunication apparatus, the method comprising:

a step of transmitting, to the IPOA server through the encapsulating portion from a transmission terminal which is the one of the IP over ATM terminals, an address resolution request for converting, into the ATM address, the IP address of the reception terminal which is the one of the LAN emulation terminals;

a step of encapsulating and transmitting, in response to the address resolution request transmitted from the transmission terminal, an address resolution reply containing an ATM address assigned to the encapsulating portion from the IPOA server through the encapsulating portion to the transmission terminal;

a step of encapsulating, in the transmission terminal, the IP packet desired to be transmitted and transmitting it to the encapsulating portion;

a step of extracting, in the encapsulating portion, the IP packet from reception data and transferring it to the frame processing portion;

a step of transmitting from the frame processing portion to the ARP processing portion the IP address of the reception terminal in order to ask the MAC address of the reception terminal;

a step of preparing, in the ARP processing portion, the ARP request containing the IP address of the reception terminal unless relevant information is held therein, and transmitting the ARP request through the MAC frame input/output portion and the bridge portion to the reception terminal with a destination MAC address as a broadcast address;

a step of preparing, in the reception terminal, an ARP reply containing the MAC address assigned to the reception terminal in response to the ARP request, and transmitting the ARP reply through the bridge portion and the MAC frame input/output portion to the ARP processing portion in accordance with the LANE protocol;

a step of obtaining, in the ARP processing portion, the MAC address of the reception terminal from the ARP reply to transmit the MAC address of the reception terminal to the frame processing portion;

a step of transmitting, in the frame processing portion, the IP packet as communication data to the MAC frame input/output portion with the MAC address of the reception terminal as the destination MAC address; and a step of encapsulating, in the MAC frame input/output portion, the IP packet transmitted from the frame processing portion into the MAC frame, and transmitting it to the reception terminal through the bridge portion.

In this invention having the above-mentioned structure, interconversion is carried out between the MAC frame encapsulation data and the LLC/SNAP encapsulation data by the use of the information related to the IPOA terminal and registered in the IPOA server. Therefore, the LANE terminal and the IPOA terminal are allowed to coexist in a same subnetwork.

DESCRIPTION OF THE PREFERRED EMBODIMENTS

Figure 1:
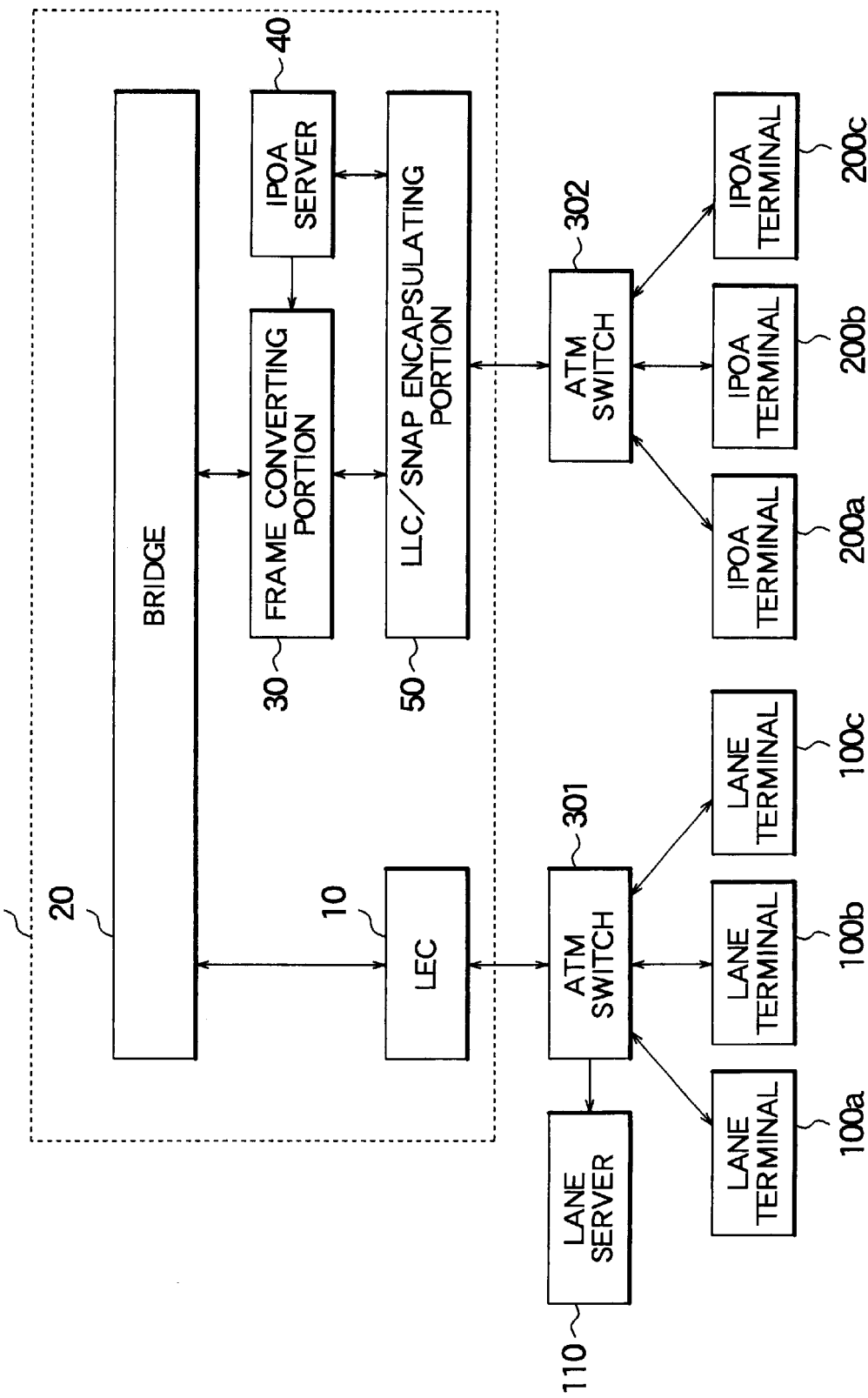
FIG. 1 is a block diagram showing an intercommunication apparatus and a communication system for which the apparatus is used, according to one embodiment of this invention.

Hereinafter, description will be made about embodiments of this invention with reference to the drawing.

The specification of LANE is defined by the ATM Forum as "LAN Emulation Over ATM Version 1.0" (af-lane-0021.000). The specification of IPOA is defined by the IETF (Internet Engineering Task Force) as "Classical IP and ARP over ATM" (RFC—Request for Comments—1577) or "NBMA (Nonbroadcast Multiaccess) Next Hop Resolution Protocol (NHRP)" (RFC2332). In the following, the reference to the IPOA represents RFC1577 or RFC2332.

Each of LECS (LAN Emulation Configuration Server), LES (LAN Emulation Server), and BUS (Broadcast and Unknown Server) in the LANE will hereinafter be referred to as a "LANE server". An ATM ARP server in RFC1577 or an NHRP (Next Hop Resolution Protocol) server in RFC2332 will hereinafter be referred to as an "IPOA server".

Referring to FIG. 1, an intercommunication apparatus according to one embodiment of this invention is applied to a communication system.

As illustrated in FIG. 1, the communication system includes a plurality of LANE terminals 100a–100c, an ATM switch 301 for carrying out switching among the LANE terminals 100a–100c, a LANE server 110 connected to the ATM switch 301 and storing address information of the LANE terminals 100a–100c, a plurality of IPOA terminals 200a–200b, an ATM switch 302 for carrying out switching among the IPOA terminals 200a–200c, and an intercommunication apparatus 1 for communication between one and another of the LANE terminals 100a–100c and the IPOA terminals 200a–200c. The intercommunication apparatus 1 comprises an LEC (LAN Emulation Client) 10 for carrying out communication with the LANE terminals 100a–100c through the ATM switch 301 by the use of the address information stored in the LANE server 110, an IPOA server 40 storing IP addresses and ATM addresses of the IPOA terminals 200a–200c, an LLC/SNAP encapsulating portion 50 connected to the ATM switch 302 and the IPOA server 40 for encapsulating an IP packet or a reply, a frame converting portion 30 for interconversion between MAC frame encapsulation data and LLC/SNAP encapsulation data prepared by the LLC/SNAP encapsulating portion 50, and a bridge 20 for data exchange between the LEC 10 and the frame converting portion 30.

Figure 2:
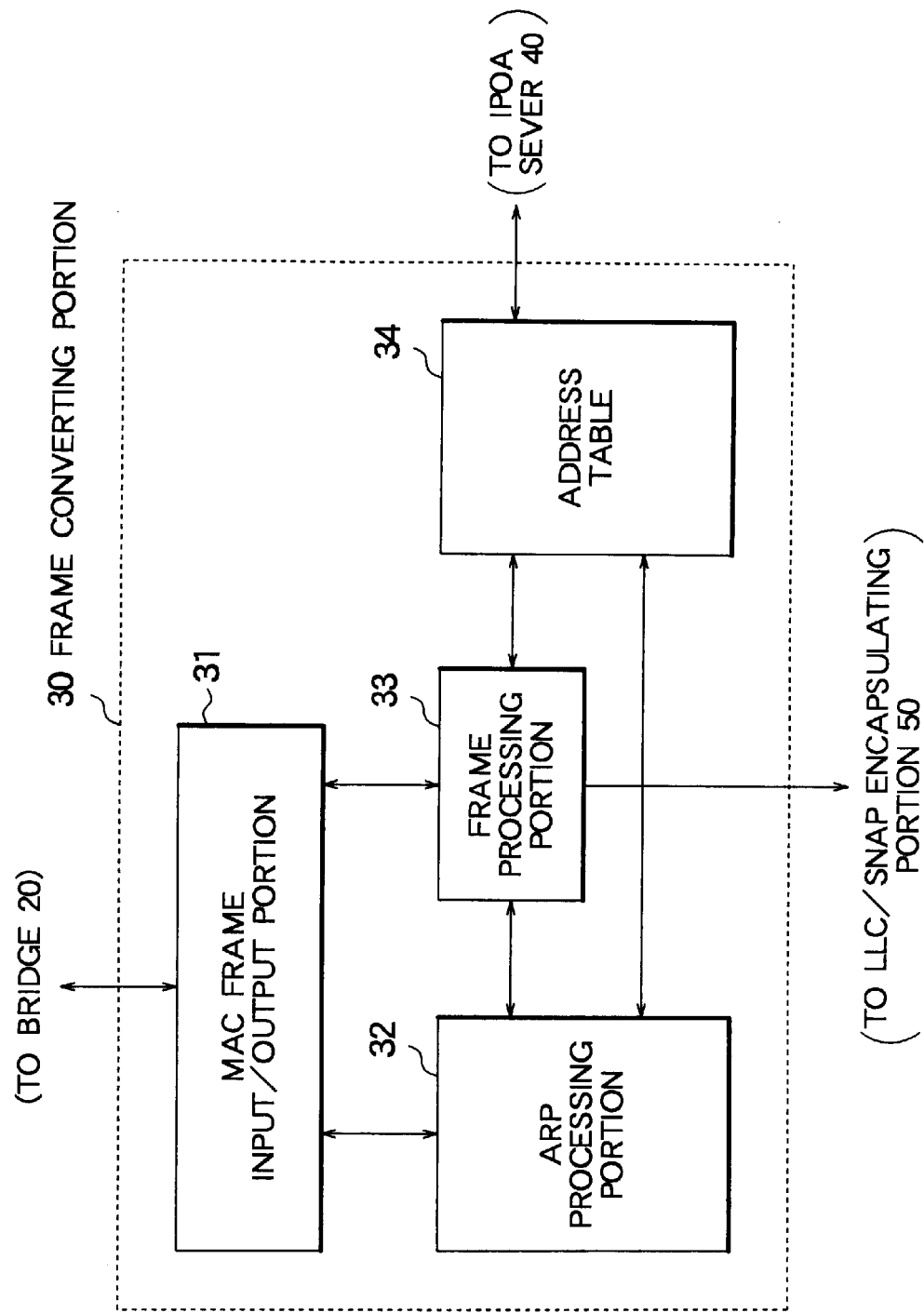
FIG. 2 is a block diagram showing the structure of a frame converting portion illustrated in FIG. 1.

Referring to FIG. 2, the frame converting portion 30 in this embodiment comprises a MAC frame input/output portion 31 for data input/output to and from the bridge 20, an address table 34 connected to the IPOA server 40 for holding information including an IP address, a MAC address, and an ATM address as entries, an ARP processing portion 32 connected to the address table 34 and having an ARP function defined by RFC826 published by the IETF for preparing and resolving an ARP request, and a frame processing portion 33 for searching the MAC address in the address table 34 with reference to the IP packet supplied thereto to obtain the ATM address.

Hereinafter, description will be made about the operation of the intercommunication apparatus having the above-mentioned structure.

At first, a communicating operation between the LANE terminal 100a and the LANE terminal 100b will be described.

Figure 3:
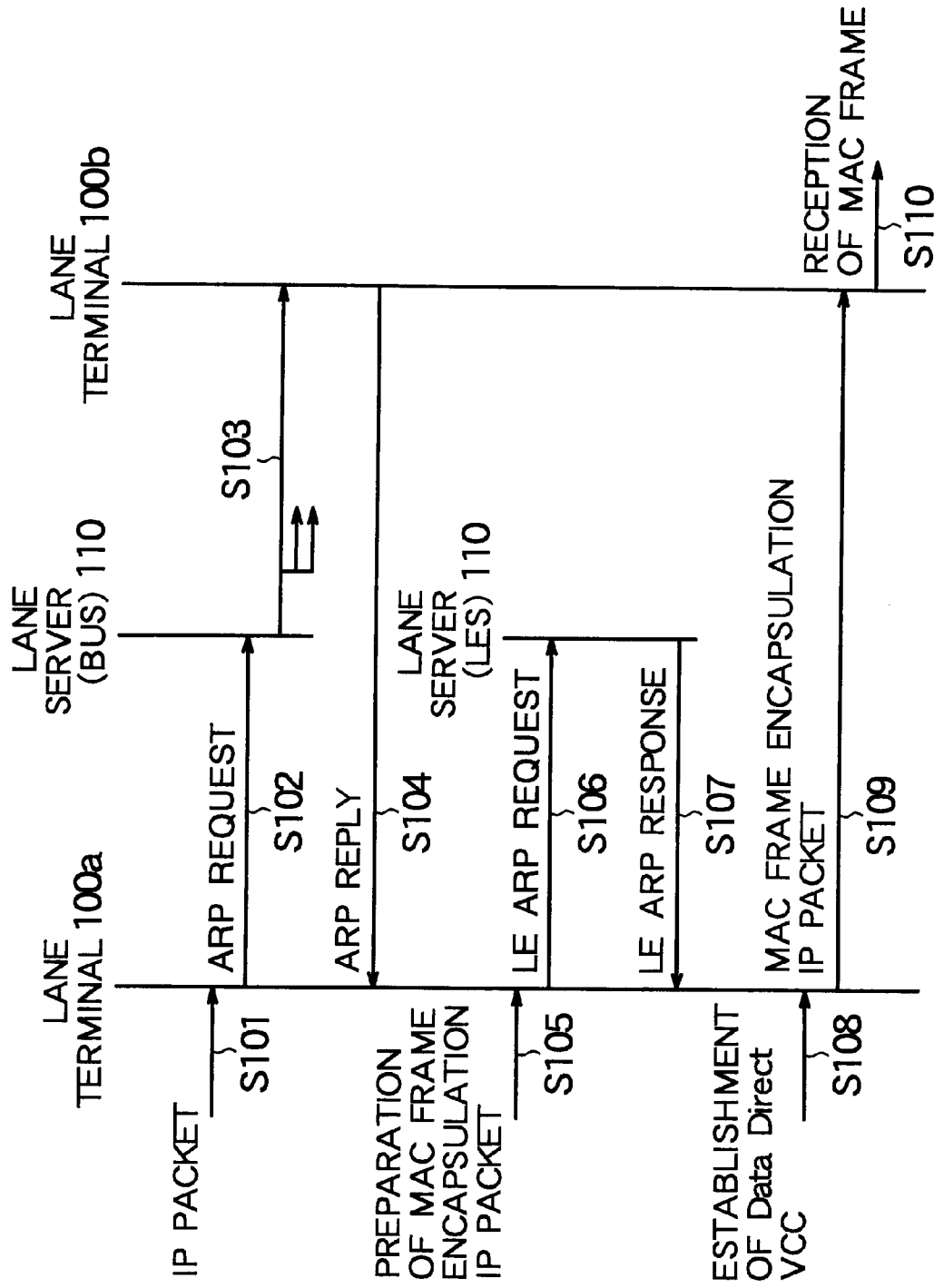
FIG. 3 is a view for describing communicating operation using the intercommunication apparatus illustrated in FIG. 1.

Referring to FIG. 3, description will be made about the communicating operation using the intercommunication apparatus illustrated in FIG. 1 in case of the communication from the LANE terminal 100a to the LANE terminal 100b will be described.

It is assumed here that the LANE terminal 100a is going to transmit a particular IP packet to the LANE terminal 100b (step S101).

In order that the LANE terminal 100a transmits the IP packet to the LANE terminal 100b, the IP packet must be encapsulated into a MAC frame. Therefore, it is necessary to know the MAC address of the LANE terminal 100b. For this purpose, the LANE terminal 100a transmits by LANE protocol an ARP request designating the IP address of the LANE terminal 100b (step S102).

The ARP request transmitted from the LANE terminal 100a is a broadcast frame and is therefore sent to the LANE server 110 (BUS) to be broadcasted by the LANE server 110 (BUS) to the LANE terminals 100a–100c and the LEC 10 (step S103).

In response to the ARP request, the LANE terminal 100b prepares an ARP reply containing the MAC address of the LANE terminal 100b and transmits the ARP reply via LANE communication to the LANE terminal 100a (step S104).

When the LANE terminal 100a receives the ARP reply transmitted from the LANE terminal 100b, the LANE terminal 100a knows the MAC address of the LANE terminal 100b from the ARP reply thus received and can prepare a MAC frame containing the IP packet to be transmitted to the LANE terminal 100b (step S105).

After subjected to LANE processing (steps S106–S108), the MAC frame is transmitted to the LANE terminal 100b (step S109). The LANE terminal 100b receives the MAC frame transmitted from the LANE terminal 100a (step S110).

Communication is similarly carried out from the LANE terminal 100b to the LANE terminal 100a in the similar manner.

Next, description will be made about communicating operation between the IPOA terminal 200a and the IPOA terminal 200b.

Figure 4:
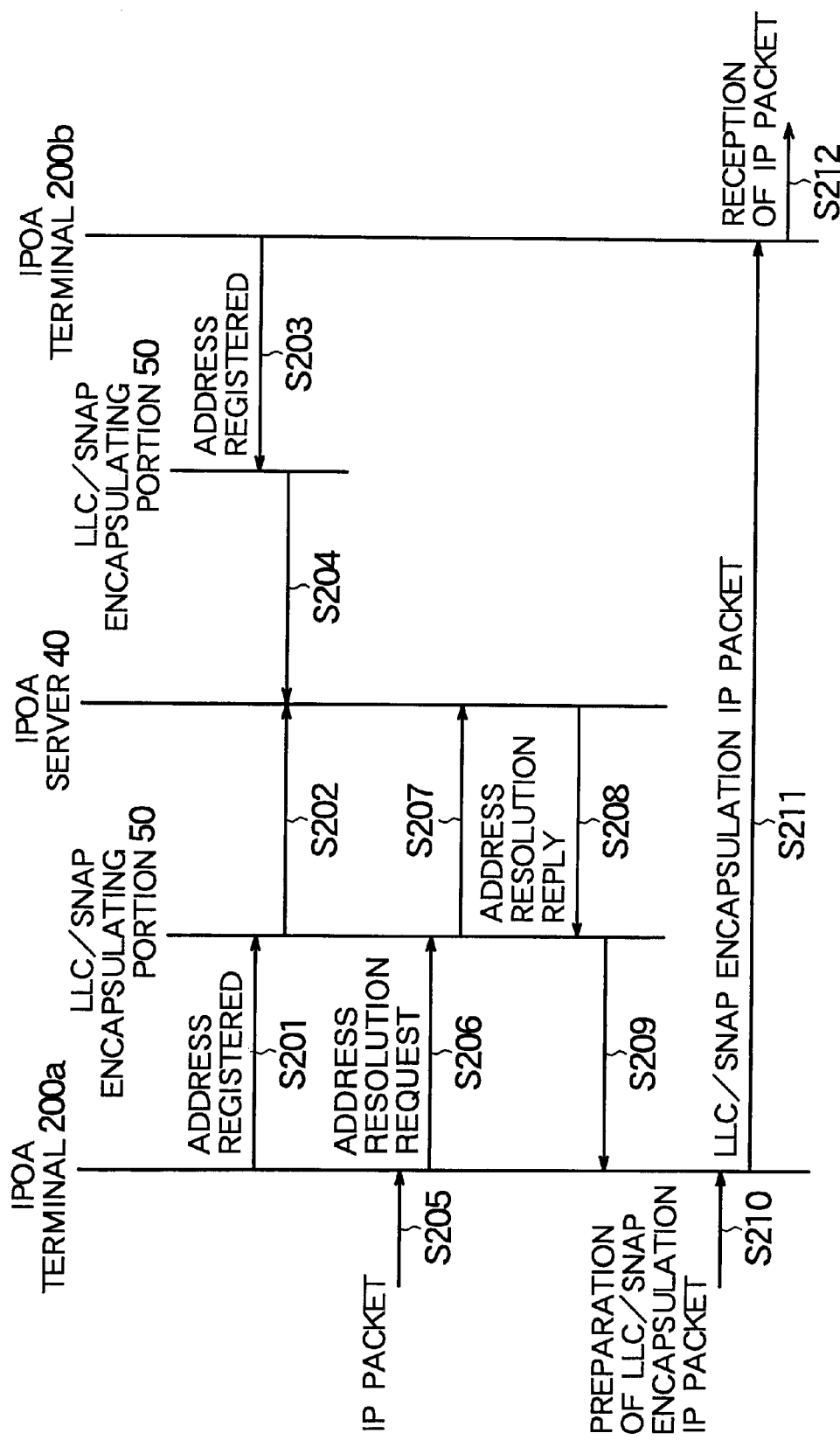
FIG. 4 is a view for describing communicating operation using the intercommunication apparatus illustrated in FIG. 1.

Referring to FIG. 4, description will be made about communicating operation using the intercommunication apparatus illustrated in FIG. 1 in case of the communication from the IPOA terminal 200a to the IPOA terminal 200b.

In accordance with an existing IPOA protocol, the IPOA terminals 200a and 200b make their own IP address and ATM address information be registered in the IPOA server 40 (steps S201–S202, S203–S204).

It is assumed here that the IPOA terminal 200a is going to transmit a particular IP packet to the IPOA terminal 200b (step S205).

In order to start communication with the IPOA terminal 200b, the IPOA terminal 200a transmits to the IPOA server 40 a request (address resolution request) for converting the IP address of the IPOA terminal 200b into the ATM address (step S206).

The address resolution request transmitted from the IPOA terminal 200a is supplied through the ATM switch 302 to be received by the LLC/SNAP encapsulating portion 50.

With reference to an LLC/SNAP header of the received data, the LLC/SNAP encapsulating portion 50 judges that the data are addressed to the IPOA server 40, and transfers to the IPOA server 40 the address resolution request thus received (step S207).

In response to the address resolution request transferred from the LLC/SNAP encapsulating portion 50, the IPOA server 40 requests the LLC/SNAP encapsulating portion 50 to transmit to the IPOA terminal 200a an address resolution reply containing the ATM address of the IPOA terminal 200b (step S208).

Then, the LLC/SNAP encapsulating portion 50 LLC/SNAP encapsulates the address resolution reply into an encapsulated address resolution reply which is transmitted to the IPOA terminal 200a (step S209).

Supplied with the encapsulated address resolution reply prepared by the LLC/SNAP encapsulating portion 50, the IPOA terminal 200a acquires the ATM address of the IPOA terminal 200b and can transmit the IP packet to the IPOA terminal 200b by the use of the ATM address (steps S210–S212).

Communication is also carried out from the IPOA terminal 200b to the IPOA terminal 200a in the similar manner.

Figure 5:
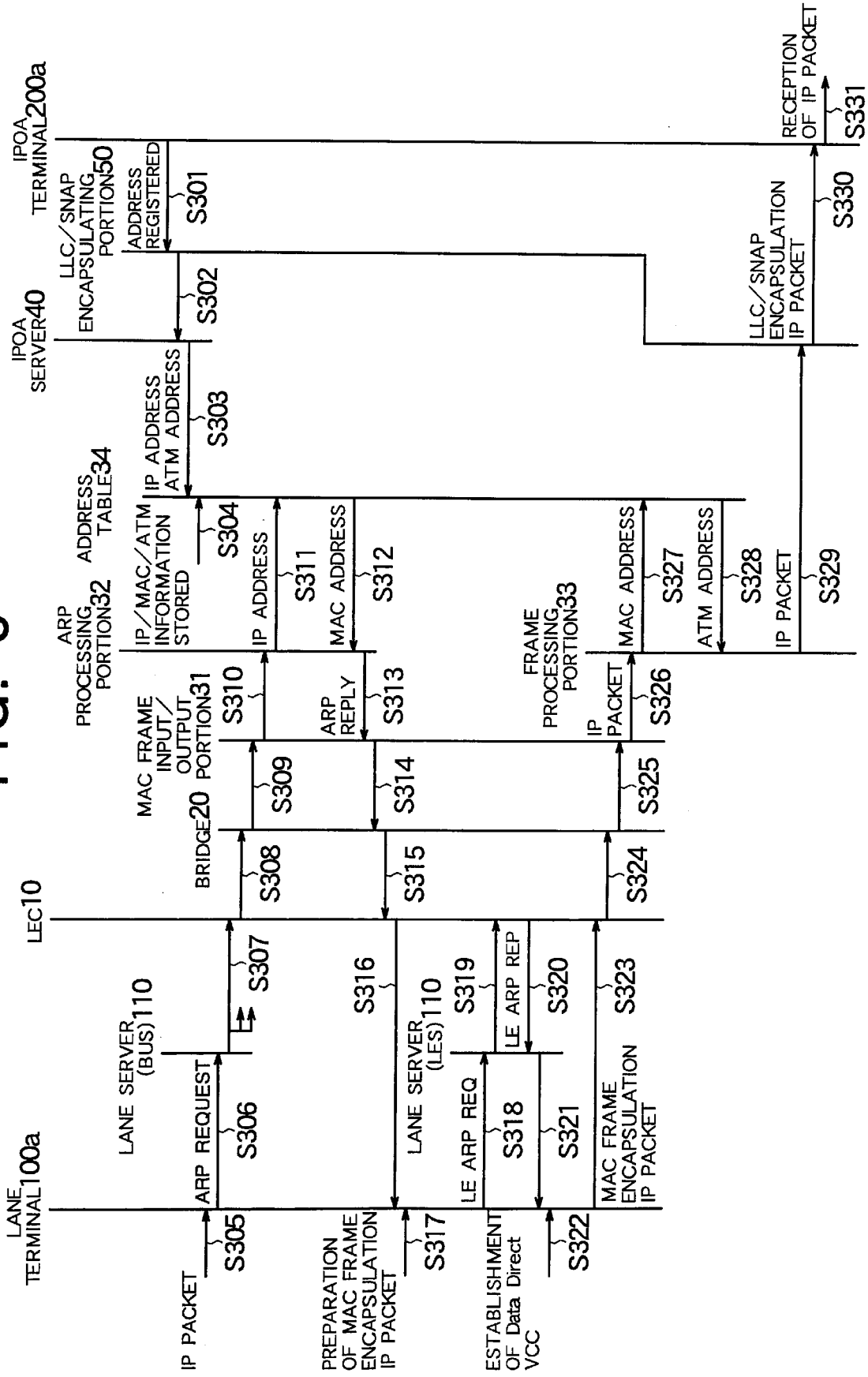
FIG. 5 is a view for describing communicating operation using the intercommunication apparatus illustrated in FIG. 1.

Referring to FIG. 5, description will be made about communicating operation using the intercommunication apparatus illustrated in FIG. 1 in case of the communication from the LANE terminal 100a to the IPOA terminal 200a.

In accordance with an existing IPOA protocol, the IPOA terminal 200a makes its own IP address and ATM address information be registered in the IPOA server 40 (steps S301–S302).

The IPOA server 40 transfers to the address table 34 in the frame converting portion 30 the IP address and the ATM address information of the IPOA terminal 200a thus registered (step S303).

Then, the address table 34 extracts the MAC address of the IPOA terminal 200a from an ESI field of the ATM address of the IPOA terminal 200a, and stores the information including the IP address, the MAC address, and the ATM address of the IPOA terminal 200a (step S304).

It is assumed here that the LANE terminal 100a is going to transmit a particular IP packet to the IPOA terminal 200a (step S305).

In order to transmit the IP packet to the IPOA terminal 200a, the IP packet must be encapsulated into the MAC frame. Therefore, the LANE terminal 100a is required to know the MAC address of the IPOA terminal 200a.

For this purpose, the LANE terminal 100a transmits, in accordance with the LANE protocol, an ARP request designating the IP address of the IPOA terminal 200a (step S306).

The ARP request transmitted from the LANE terminal 100a is a broadcast frame and is therefore transmitted to the LANE server 110 (BUS) to be broadcasted by the LANE server 110 (BUS) to the LANE terminals 100a–100c and the LEC 10 (step S307).

The LEC 10 transfers to the bridge 20 the ARP request supplied thereto (step S308).

Then, the bridge 20 transfers to the MAC frame input/output portion 31 in the frame converting portion 30 the ARP request transferred from the LEC 10 (step S309).

The MAC frame input/output portion 31 transfers to the ARP processing portion 32 the ARP request transferred from the bridge 20 (step S310).

Then, the ARP processing portion 32 resolves the ARP request transferred from the MAC frame input/output portion 31 and searches the address table 34 by the use of the IP address of the IPOA terminal 200a as a target IP address in the ARP request (step S311).

Since the IP address of the IPOA terminal 200a is registered in the address table 34, the ARP processing portion 32 can acquire the MAC address of the IPOA terminal 200a (step S312).

The ARP processing portion 32 prepares an ARP reply containing the MAC address of the IPOA terminal 200a and transfers the reply to the MAC frame input/output portion 31 (steps S313).

The MAC frame input/output portion 31 transfers to the bridge 20 the ARP reply transferred from the ARP processing portion 32 (step S314).

The bridge 20 transfers to the LEC 10 the ARP reply transferred from the MAC frame input/output portion 31 (step S315).

In accordance with the LANE protocol, the LEC 10 transmits to the LANE terminal 100a the ARP reply transferred from the bridge 20 (step S316).

Supplied with the ARP reply, the LANE terminal 100a can know the MAC address of the IPOA terminal 200a and can prepare the MAC frame containing the IP packet to be transmitted to the IPOA terminal 200a (step S317).

The MAC frame prepared by the LANE terminal 100a is transmitted to the LEC 10 in accordance with the LANE protocol (steps S318–S323).

The LEC 10 transfers to the bridge 20 the MAC frame supplied thereto (step S324).

The bridge 20 transfers to the MAC frame input/output portion 31 in the frame converting portion 30 the MAC frame transferred from the LEC 10 (step S325).

The MAC frame input/output portion 31 extracts the IP packet from the MAC frame transferred from the bridge 20 and transfers the packet to the frame processing portion 33 together with a destination MAC address (MAC address of the IPOA terminal 200a) (step S326).

The frame processing portion 33 searches the address table 34 with reference to the destination MAC address transferred from the MAC frame input/output portion 31 (step S327).

Since the MAC address of the IPOA terminal 200a is registered in the address table 34, the frame processing portion 33 can acquire the ATM address of the IPOA terminal 200a (step S328).

The frame processing portion 33 transmits to the LLC/SNAP encapsulating portion 50 the IP packet and the ATM address of the IPOA terminal 200a (step S329).

The LLC/SNAP encapsulating portion 50 LLC/SNAP encapsulates the IP packet and transmits the encapsulated packet to the IPOA terminal 200a (step S330).

The IPOA terminal 200a receives through the ATM switch 302 the LLC/SNAP encapsulation IP packet (step S331).

Figure 6:
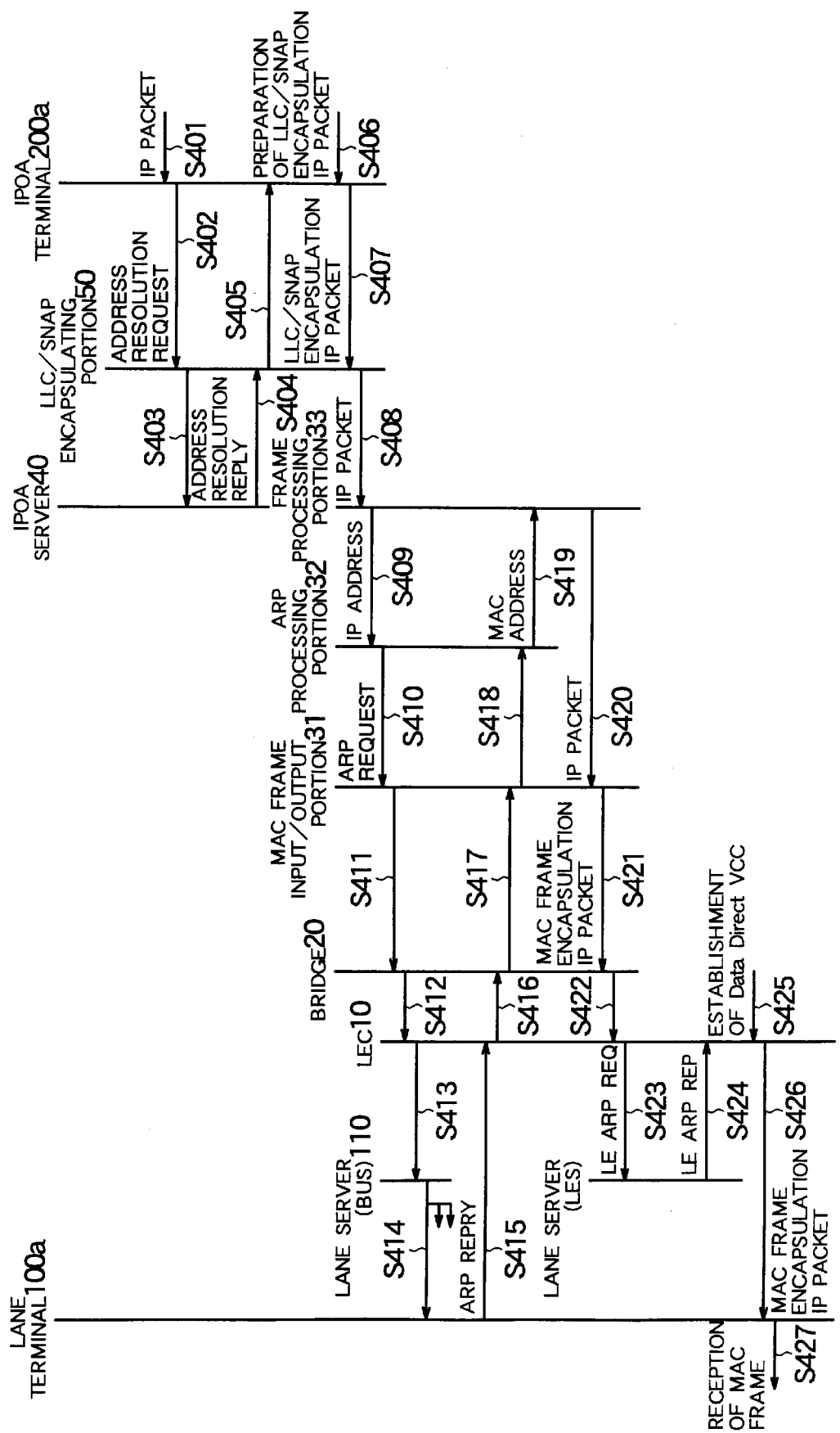
FIG. 6 is a view for describing communicating operation using the intercommunication apparatus illustrated in FIG. 1.

Referring to FIG. 6, description will be made about communicating operation using the intercommunication apparatus illustrated in FIG. 1 in case of the communication from the IPOA terminal 200a to the LANE terminal 100a.

It is assumed here that the IPOA terminal 200a is going to transmit a particular IP packet to the LANE terminal 100a (step S401).

In order to start communication with the LANE terminal 100a, the IPOA terminal 200a transmits to the IPOA server 40 an address resolution request for converting the IP address of the LANE terminal 100a into the ATM address (step S402).

The address resolution request transmitted from the IPOA terminal 200a is transferred through the ATM switch 302 to the LLC/SNAP encapsulating portion 50.

With reference to an LLC/SNAP header of the received data, the LLC/SNAP encapsulating portion 50 judges that the data are addressed to the IPOA server 40, and transfers to the IPOA server 40 the address resolution request supplied thereto (step S403).

The IPOA server 40 does not hold the information of the LANE terminal 100a requested by the address resolution request and therefore prepares an address resolution reply containing, instead of the ATM address of the LANE terminal 100a, the ATM address assigned to the LLC/SNAP encapsulating portion 50.

The IPOA server 40 requests the LLC/SNAP encapsulating portion 50 to transmit to the IPOA terminal 200a the address resolution reply thus prepared (step S404).

Then, the LLC/SNAP encapsulating portion 50 LLC/SNAP encapsulates the address resolution reply and transmits the encapsulated address resolution reply to the IPOA terminal 200a (step S405).

Supplied with the address resolution reply, it seems as if the IPOA terminal 200a acquires the ATM address of the LANE terminal 100a.

The IPOA terminal 200a LLC/SNAP encapsulates the IP packet desired to be transmitted (step S406) and transmits the encapsulated packet to the ATM address thus acquired (step S407).

The LLC/SNAP encapsulation IP packet is actually received by the LLC/SNAP encapsulating portion 50.

The LLC/SNAP encapsulating portion 50 extracts the IP packet from the received data by removing the LLC/SNAP header therefrom, and transfers the packet to the frame processing portion 33 in the frame converting portion 30 (step S408).

As the information for encapsulating the IP packet into the MAC frame, the frame processing portion 33 is required to know the MAC address of the LANE terminal 100a as a destination of the IP packet. For this purpose, the frame processing portion 33 transmits to the ARP processing portion 32 the IP address of the LANE terminal 100a to thereby ask the MAC address of the LANE terminal 100a (step S409).

Holding no relevant information, the ARP processing portion 32 prepared an ARP request containing the IP address of the LANE terminal 100a, and transfers the ARP request to the MAC frame input/output portion 31 with the destination MAC address as a broadcast address (step S410).

The MAC frame input/output portion 31 encapsulates the ARP request into the MAC frame which is transferred to the bridge 20 (step S411).

The bridge 20 transfers to the LEC 10 the ARP request transferred from the MAC frame input/output portion 31 (step S412).

In accordance with the LANE protocol, the LEC 10 processes the ARP request transferred from the bridge. In this event, the ARP request is broadcasted through the LANE server 110 (BUS) to the LANE terminals 100a–100c and the LEC 10 (steps S413–S414).

In response to the ARP request supplied thereto, the LANE terminal 100a prepares the ARP reply containing its own MAC address because the target IP address in the ARP request is its own address, and transmits the ARP reply to the LEC 10 in accordance with the LANE protocol (step S415).

Then, the LEC 10 transfers to the bridge 20 the ARP reply supplied thereto (step S416).

The bridge 20 transfers to the MAC frame input/output portion 31 in the frame converting portion 30 the ARP reply transferred from the LEC 10 (step S417).

The MAC frame input/output portion 31 extracts the ARP reply from the MAC frame and transfers the reply to the ARP processing portion 32 (step S418).

The ARP processing portion 32 obtains the MAC address of the LAN terminal 100a and transmits it to the frame processing portion 33 (step S419).

The frame processing portion 33 transmits the IP packet as communication data to the MAC frame input/output portion 31 with the MAC address of the LANE terminal 100a as the destination MAC address (step S420).

The MAC frame input/output portion 31 encapsulates the IP packet transferred from the frame processing portion 33 into the MAC frame which is transmitted to the bridge 20 (step S421).

The bridge 20 transfers the MAC frame to the LEC 10 (step S422).

The LEC 10 processes the MAC frame transferred from the bridge 20 in accordance with the LANE protocol. In this case, transmission to the LANE terminal 100a takes place (steps S423–S426).

The LANE terminal 100a receives the MAC frame containing the IP packet as communication data (step S427).

This invention is not restricted to the above-mentioned combinations. The operation can be similarly carried out for any other combination.

As regards the difference in maximum length (MTU) (Maximum Transmission Unit) of the transmission data between the LANE terminals 100a–100c and the IPOA terminals 200a–200c, use may be made of either of a method of fragmenting the IP packet in the frame converting portion 30 and a method of covering by the manner of operation.

Description will be made about the method of fragmenting the IP packet in the frame converting portion 30. It is assumed that the LANE terminals 100a–100c are given smaller MTU than that in the IPOA terminals 200a–200c and that the IPOA terminal transmits the IP packet greater in length than the MTU of the LANE terminal. In this event, the frame processing portion 33 in the frame converting portion 30 fragments the IP packet.

On the contrary, it is assumed that the IPOA terminals 200a–200c are given smaller MTU than that in the LANE terminals 100a–100c and that the LANE terminal transmits the IP packet greater in length than the MTU of the IPOA terminal. In this event, the frame processing portion 33 in the frame converting portion 30 fragments the IP packet.

On the other hand, in the method of covering by the manner of operation, the MTUs of the LANE terminals and the IPOA terminals are preliminarily selected to have an equal value which is coincident with the smaller one. Thus, no difference in MTU occurs.

Figure 7:
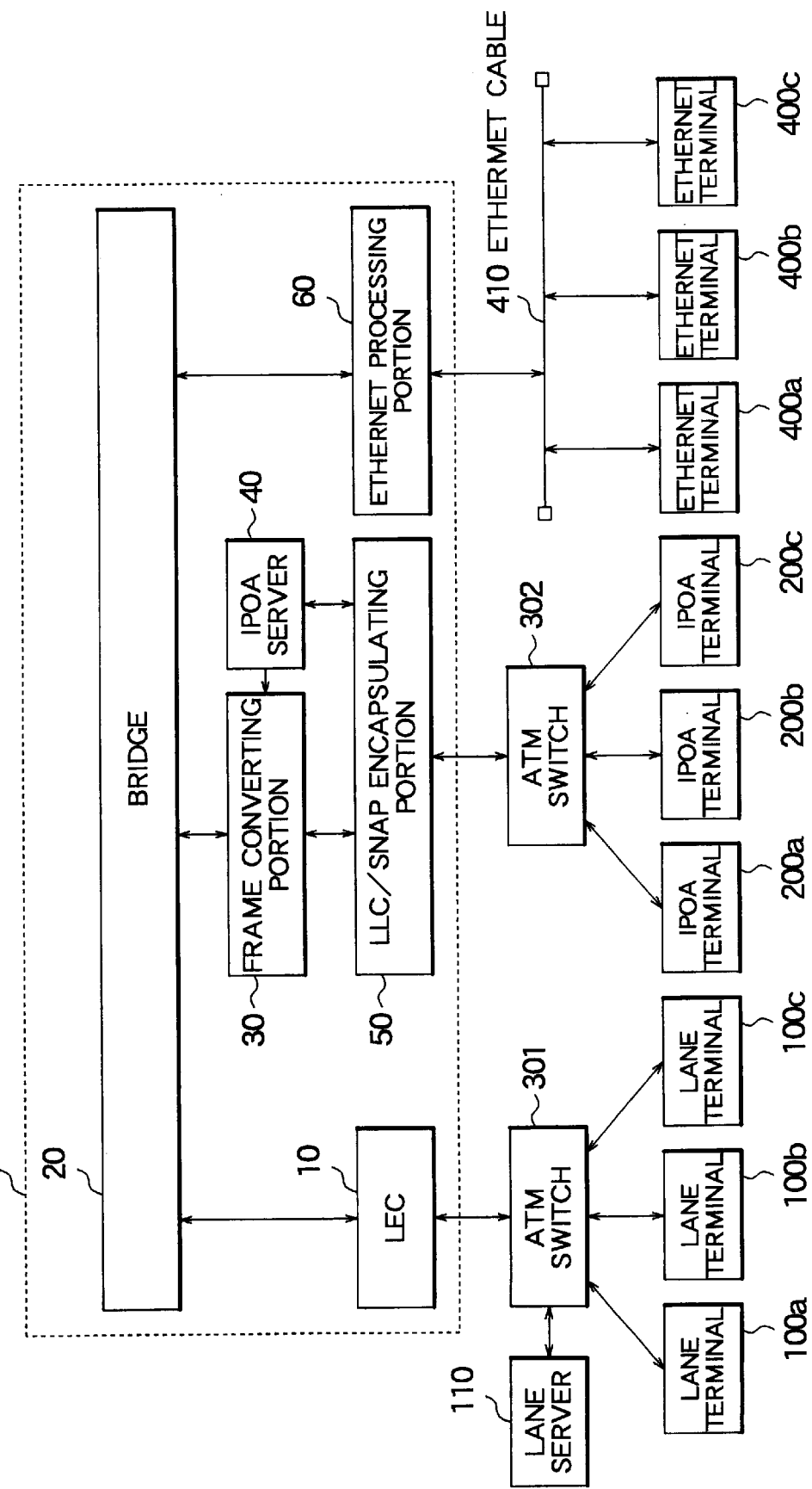
FIG. 7 is a block diagram showing an intercommunication apparatus and a communication system for which the apparatus is used, according to another embodiment of this invention.

Referring to FIG. 7, description will be made about an intercommunication apparatus according to another embodiment of this invention and a communication system for which the apparatus is used.

As illustrated in FIG. 7, this embodiment is different from the embodiment illustrated in FIG. 1 only in that the bridge 20 is connected to an Ethernet processing portion 60 and that the Ethernet processing portion 60 is connected to an Ethernet cable 410 and to Ethernet terminals 400a–400b through the Ethernet cable 410.

In the embodiments described above, IP is assumed as a protocol of a network layer and description has been made on its vocabulary. However, this invention is not restricted thereto. Utilizing the principle of this invention, any protocol other than IP, for example, IPX (International Packet Exchange) can be similarly embodied.

In the foregoing embodiments, description has been made about the case where two ATM switches are provided. However, such structure is taken for the convenience of description but the principle of this invention can be directly applied in case where three or more ATM switches are interconnected. The LANE terminal or the IPOA terminal can be connected to a desired one of the ATM switches.

In the foregoing embodiments, description has been made about the case where both of the LANE terminals and the IPOA terminals are equal to three in number. However, such structure is taken for the convenience of description but the principle of this invention can be indirectly applied to the case where four or more LANE terminals or IPOA terminals are connected.

In case of any change in the specification of the LANE or the IPOA to which this invention is addressed, the principle of this invention can directly be applied as far as the essential specification of the LANE or the IPOA shown in the foregoing embodiments is not changed.

As described above, according to this invention, provision is made of the function of interconversion between the MAC frame encapsulation data and the LLC/SNAP encapsulation data by the use of the information related to the IPOA terminal and registered in the IPOA server. Therefore, it is possible to allow coexistence of the LANE terminal and the IPOA terminal in a same subnetwork.

By the function of interconversion between the MAC frame encapsulation IP packet and the LLC/SNAP encapsulation IP packet, no more than the MAC frame encapsulation IP packet is seen from the LANE terminal while no more than the LLC/SNAP encapsulation IP packet is seen from the IPOA terminal. Therefore, it is unnecessary to change existing resources such as the LANE server, the LANE terminals, the IPOA terminals, and the ATM switches at all.

What is claimed is:

1. An intercommunication apparatus (1) for carrying out communication between one and another of LAN (Local Area Network) emulation terminals (100a, 100b, 100c) and IP (Internet Protocol) over ATM (Asynchronous Transfer Mode) terminals (200a, 200b, 200c), said apparatus comprising:

an IPOA (IP over ATM) server (40) which stores information related to said IP over ATM terminals;

an encapsulating portion (50) for encapsulating input data;

a frame converting portion (30) for carrying out, by the use of the information stored in said IPOA server, interconversion between MAC (Media Access Control) frame encapsulation data and LLC/SNAP (Logical Link Control/SubNetwork Attachment Point) encapsulation data prepared by said encapsulating portion; and a bridge portion (20) for exchanging data between said LAN emulation terminals and said frame converting portion.

2. An intercommunication apparatus as claimed in claim 1, wherein said frame converting portion comprises:

a MAC frame input/output portion (31) for input and output of data to and from said bridge portion;

an address table (34) connected to said IPOA server and holding information including an IP address, a MAC address, and an ATM address as entries;

an ARP (Address Resolution Protocol) processing portion (32) connected to said address table for preparing and resolving an ARP request; and a frame processing portion (33) responsive to an IP packet supplied thereto for searching the MAC address in said address table to acquire the ATM address.

3. A communication method for carrying out communication between one and another of said LAN emulation terminals by the use of said intercommunication apparatus claimed in claim 2, said method comprising:

a step (S102) of transmitting said ARP request designating the IP address of a reception terminal of said LAN emulation terminals from a transmission terminal of said LAN emulation terminals to other LAN emulation terminals by a LANE (LAN emulation) protocol;

a step (S104) of preparing, in said reception terminal, an ARP reply including the MAC address of said reception terminal, and transmitting said ARP reply to said transmission terminal by communication using the LANE protcol; and a step (S105, S109) of preparing, in said transmission terminal, a MAC frame containing the IP packet to be transmitted to said reception terminal by the use of the MAC address contained in the ARP reply transmitted from said reception terminal, and transmitting to said reception terminal the MAC frame thus prepared.

4. A communication method for carrying out communication between one and another of said IP over ATM terminals by the use of said intercommunication apparatus claimed in claim 2, said method comprising:

a step (S206) of transmitting from a transmission terminal of said IP over ATM terminals through said encapsulating portion to said IPOA server an address resolution request for converting the IP address of a reception terminal of said IP over ATM terminals into the ATM address;

a step (S208) of encapsulating and transmitting, in response to the address resolution request transmitted from said transmission terminal, an address resolution reply containing the ATM address of said reception terminal from said IPOA server through said encapsulating portion to said transmission terminal; and a step (S211) of transmitting the IP packet to said reception terminal by the use of the ATM address of said reception terminal contained in said address resolution reply.

5. A communication method for carrying out communication from a transmission terminal being one of said LAN emulation terminals to a reception terminal being one of said IP over ATM terminals by the use of said intercommunication apparatus claimed in claim 2, said method comprising:

a step (S301, S302) of registering, in said IPOA server, IP address and ATM address information of said reception terminal;

a step (S303) of transferring to said address table the IP address and the ATM address information of said reception terminal registered in said IPOA server;

a step (S304) of extracting, in said address table, the MAC address of said reception terminal from an ESI (End System Identifier) field of the ATM address of said reception terminal and storing the information of the IP address, the MAC address, and the ATM address of said reception terminal;

a step (S306–S310) of transmitting, from said transmission terminal through said bridge portion and said MAC frame input/output portion to said ARP processing portion in accordance with a LANE (LAN emulation) protocol, the ARP request designating the IP address of said reception terminal;

a step (S313–S316) of resolving, in said ARP processing portion, said ARP request, detecting the MAC address of said reception terminal from said address table by the use of the IP address of said reception terminal as a target IP address in the ARP request, preparing the ARP reply containing the MAC address, and transmitting it to said transmission terminal through said MAC frame input/output portion and said bridge portion;

a step (S317–S326) of preparing, in said transmission terminal, the MAC frame containing the IP packet to be transmitted to said reception terminal in response to the ARP reply, and transmitting it to said frame processing portion through said bridge portion and said frame input/output portion;

a step (S327–S329) of detecting, in said frame processing portion, the ATM address of said reception terminal from said address table with reference to the MAC address contained in the MAC frame, and transmitting the ATM address and the IP packet to said encapsulating portion; and a step (S330) of encapsulating, in said encapsulating portion, the IP packet and transmitting it to said reception terminal.

6. A communication method for carrying out communication from one of said IP over ATM terminals to one of said LAN emulation terminals by the use of said intercommunication apparatus claimed in claim 2, said method comprising:

- a step (S402, S403) of transmitting, to said IPOA server through said encapsulating portion from a transmission terminal which is said one of the IP over ATM terminals, an address resolution request for converting, into the ATM address, the IP address of said reception terminal which is said one of the LAN emulation terminals;
- a step (S404, S405) of encapsulating and transmitting, in response to the address resolution request transmitted from said transmission terminal, an address resolution reply containing an ATM address assigned to said encapsulating portion from said IPOA server through said encapsulating portion to said transmission terminal;
- a step (S406, S407) of encapsulating, in said transmission terminal, the IP packet desired to be transmitted and transmitting it to said encapsulating portion;
- a step (S408) of extracting, in said encapsulating portion, the IP packet from reception data and transferring it to said frame processing portion;
- a step (S409) of transmitting from said frame processing portion to said ARP processing portion the IP address of said reception terminal in order to ask the MAC address of said reception terminal;
- a step (S410–S414) of preparing, in said ARP processing portion, the ARP request containing the IP address of said reception terminal unless relevant information is held therein, and transmitting the ARP request through said MAC frame input/output portion and said bridge portion to said reception terminal with a destination MAC address as a broadcast address;
- a step (S415–S418) of preparing, in said reception terminal, an ARP reply containing the MAC address assigned to said reception terminal in response to the ARP request, and transmitting the ARP reply through said bridge portion and said MAC frame input/output portion to said ARP processing portion in accordance with the LANE protocol;
- a step (S419) of obtaining, in said ARP processing portion, the MAC address of said reception terminal from said ARP reply to transmit the MAC address of said reception terminal to said frame processing portion;
- a step (S420) of transmitting, in said frame processing portion, the IP packet as communication data to said MAC frame input/output portion with the MAC address of said reception terminal as the destination MAC address; and
- a step (S421–S426) of encapsulating, in said MAC frame input/output portion, the IP packet transmitted from said frame processing portion into the MAC frame, and transmitting it to said reception terminal through said bridge portion.

* * * * *